(12) United States Patent
Kim (10) Patent No.: US 6,488,122 B2
(45) Date of Patent: Dec. 3, 2002

(54) APPARATUS FOR GENERATING ROTATIVE FORCE USING SPRING

(75) Inventor: Bu Ja Kim, Shihung (KR)

(73) Assignee: Han Sung Enertec Co., Ltd., Chollabuk-do (KR)

(*) Notice: Subject to any disclaimer, the term of this patent is extended or adjusted under 35 U.S.C. 154(b) by 0 days.

(21) Appl. No.: 09/871,489

(22) Filed: May 30, 2001

(65) Prior Publication Data

US 2002/0011382 A1 Jan. 31, 2002

(30) Foreign Application Priority Data

Jul. 29, 2000 (KR) ........................................ 2000-43940

(51) Int. Cl.[7] .............................................. F03G 1/00
(52) U.S. Cl. .............................. 185/44; 185/38; 185/39
(58) Field of Search ............................. 185/37, 38, 44, 185/45, 39

(56) References Cited

U.S. PATENT DOCUMENTS

| 4,469,197 A | * | 9/1984 | Ishida | 185/37 |
| 4,676,122 A | * | 6/1987 | Szabo et al. | 185/38 |
| 4,715,475 A | * | 12/1987 | Minoru | 185/38 |
| 4,881,621 A | * | 11/1989 | Ishida | 185/38 |
| 4,911,268 A | * | 3/1990 | Kulpa | 185/37 |
| 5,103,936 A | | 4/1992 | Morikawa | 185/39 |
| 5,638,922 A | | 6/1997 | Morikawa | 185/39 |
| 2002/0011382 A1 | * | 1/2002 | Kim | 185/44 |

* cited by examiner

Primary Examiner—David Fenstermacher
(74) Attorney, Agent, or Firm—Lee & Hong (57) ABSTRACT

An apparatus for generating rotative force using spring according to the present invention permits rotative force of an input shaft to be intermitted to an acceleration gear by an intermitting gear, an available time for the rotation of an output shaft to be confirmed by an indicating means, and the operation to be stopped by a stopping means. In addition, the apparatus causes the rotation of the output shaft to be stopped exactly in '0' position of the available time by a setting means. Therefore, since the present invention intermits rotative force only by the intermitting gear, a production cost is reduced by the simple configuration, and thus the apparatus according to the present invention could be provided with low cost. In addition, the convenience in use is increased, since user could confirm the available time of rotation, the operation could be stopped while generating the rotative force, and the apparatus could operate in an inclined or upside down position.

5 Claims, 10 Drawing Sheets

APPARATUS FOR GENERATING ROTATIVE FORCE USING SPRING

BACKGROUND OF THE INVENTION

1. Field of the Invention

The present invention relates to an apparatus for generating rotative force using a spring, more specifically the apparatus for generating rotative force using the spring, which is simplified in its configuration and increases convenience in use.

2. Background of the Related Art

A motor and engine are referred to as an apparatus for generating rotative force generally, and these means are applied to various fields of the industry.

However, as electricity or liquid/solid fuel is required to operate the apparatus for generating rotative force, the usage thereof is limited where the provision of electricity and fuel are difficult.

An apparatus for generating rotative force using spring is provided to solve the above problem, and the configuration thereof is as follows.

Figure 9:
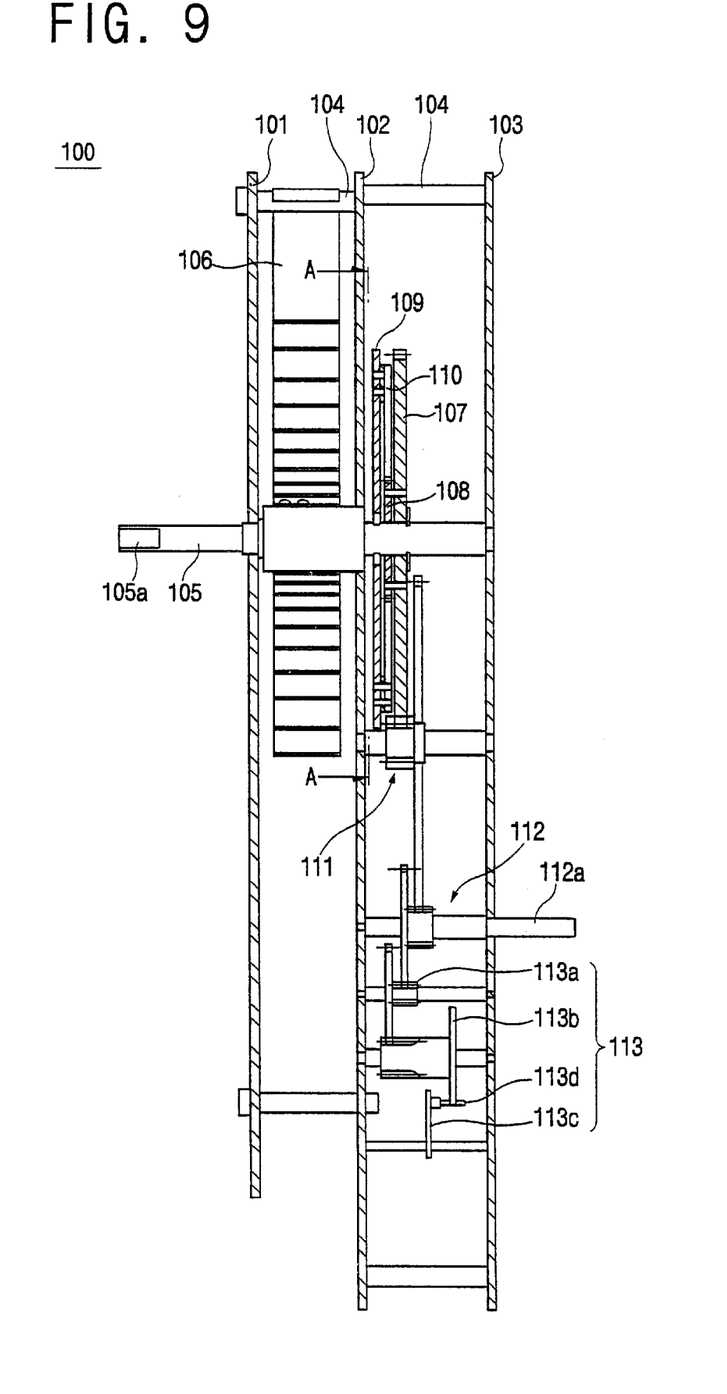
FIG. 9 is a sectional view for describing a rotative force generating process of a prior apparatus for generating rotative force using spring.
Figure 10:
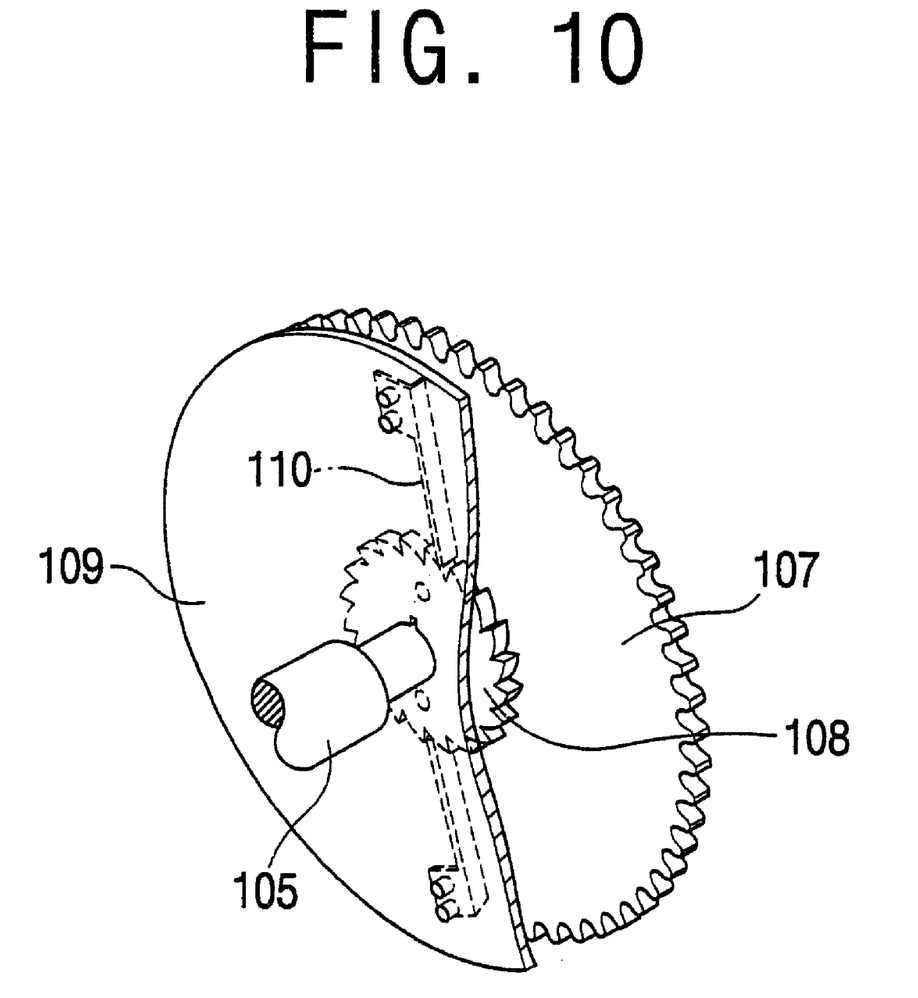
FIG. 10 is a perspective view taken along a line A—A of FIG. 9.

FIG. 9 is a sectional view for describing a rotative force generating process of a prior apparatus for generating rotative force using spring, and FIG. 10 is a perspective view taken along a line A—A of FIG. 9.

A reference numeral 101, 102, and 103 is a first, second, and third partition fixed by fastener 104 in order to have a predetermined interval.

An input shaft 105 is coupled rotatively through the first, second, and third partition 101, 102, 103, one end of the input shaft 105 is projected to an outside of the first partition 101, and in the projected end of the input shaft 105 a joining part 105a having a flat surface is formed.

On an outer circumference of the input shaft 105 between the first and second partition 101, 102, a spring 106 is wound spirally. An inner end of the spring 106 is fixed on the outer circumference, and an outer end of the spring 106 is fixed by being hooked over the fastener 104 fixing the first and second partition 101, 102.

To the input shaft 105 between the second and third partition 102, 103, a main gear 107 is coupled slidably, and to a side of the main gear 107 a ratchet wheel 108 is fixed.

A rotating plate 109 is fixed adjacent to the ratchet wheel 108, an outer end of a blocking plate 110 is fixed to the rotating plate 109, and an inner end of the blocking plate 110 is inserted elastically in a dedendum of the ratchet wheel 108.

In the above configuration, as the input shaft is rotated counterclockwise (to the left), the inner end of the blocking plate 110 slides out from the ratchet wheel 108 thereby rotative force of the input shaft 105 is not transmitted to the main gear 107, and as the input shaft is rotated clockwise, the inner end of the blocking plate 110 is locked in the dedendum of the ratchet wheel thereby rotative force of the input shaft 106 is transmitted to the main gear 107.

Rotative force of the main gear 107 is increased by the first and second accelerating gear 111, 112, the increased rotative force is output through an output shaft 112a fixing the second accelerating gear 112 rotatively, and the rotating speed of the output shaft 112a is maintained constantly by a controlling means 113.

The controlling means 113 comprises an accelerating gear 113a engaged with the second accelerating gear 112, a ratchet wheel 113b rotated by the accelerating gear 113a, pendulum plate 113c installed rotatively adjacent to the ratchet wheel 113b, and a pair of blocking pin 113d fixed to the pendulum plate 113c and inserted in a dedendum of the ratchet wheel 113b repeatedly and sequentially.

These control means 113 control the rotating speed of the output shaft 112a by the operation, in which the pair of the blocking pin 113d slides along a tooth face of the ratchet wheel 113b rotating with the output shaft 112a and the blocking pin 113d is inserted in the dedendum of the ratchet wheel 113b.

In trying to generating rotative force by the apparatus of the prior art, firstly with coupling a knob (not shown) to the joining part 105a, the input shaft 105 is rotated counterclockwise by external force.

In the above rotation of the input shaft 105, as the inner end of the blocking plate 110 slides on the tooth of the ratchet wheel 108, the rotative force of the input shaft 110 is not transmitted to the main gear 107 and the spring 106 is wound around the input shaft 105 so as to store the elastic rotative force.

As the input shaft is not rotated, the tooth of the ratchet wheel 108 locks the inner end of the blocking plate 110. Therefore, there is no problem the input shaft is reverse-rotated rapidly by the elasticity of the spring 106.

When external force is applied no more after rotating the input shaft by a certain number with knob, the input shaft 105 and the main gear 107 is rotated clockwise, and rotative force of the main gear 107 is increased by the first and second gear 111, 112 and output through the output shaft 112a.

Accordingly, the apparatus 100 as mentioned above is applied widely to the place requiring rotative force, as rotative force could be generated for quite long time.

However, since the apparatus 100 of prior art has the ratchet wheel 108, the rotating plate 109, the blocking plate 110 and the like to intermit rotative force of the input force 105 on the main gear 107, the configuration thereof is not simple. Also, available time of rotative force is not indicated, the apparatus could be stopped during operation, so that the inconvenience of usage exists.

SUMMARY OF THE INVENTION

The present invention is contemplated to solve the aforementioned problem, and it is an object of the present invention to provide an apparatus for generating rotative force using spring, which could be provided with low cost by reducing a production cost due to the simplified configuration for intermitting rotative force of an input shaft and a spring to an output shaft, and also increases the convenience in use by indicating the available time of rotation and being stopped during operation.

To accomplish the above object, it is provided an apparatus for generating rotative force using spring having: an input shaft; a main gear to which rotative force is transmitted by the input shaft; a spring wound spirally on an outer circumference of a main gear shaft, an inner end of the spring being fixed on the outer circumference of the main gear shaft, an outer end of the spring being fixed on a predetermined position; accelerating gears installed to a lower part of the main gear to increase rotative force of the main gear; an intermitting gear for intermitting rotative force of the main gear to the accelerating gears by sliding up and down along the rotation direction of the main gear with being engaged with the main gear; an output shaft outputting rotative force increased by the accelerating gears; and controlling means controlling rotating speed of the output shaft constantly, wherein elastic rotative force is stored into the spring as the input shaft being rotated by external force and the output shaft is rotated by the elastic rotative force stored in the spring as the external force being removed from the input shaft, being characterized in that the intermitting gear is supported toward the accelerating gear by elastic force so that rotative force of the main gear is transmitted to the accelerating gears through the intermitting gear when the apparatus is inclined or upside down.

In addition, the control means includes: a ratchet wheel rotating together with output gear; a pendulum plate installed rotatably to an upper part of the ratchet wheel; and a pair of blocking projections formed integrally in a lower part of the pendulum plate toward the ratchet wheel to be inserted in the ratchet wheel sequentially and repeatedly.

Meanwhile, the available time of rotation in the output shaft is represented by an indicating means, and the indicating means includes: a first, second, and third deceleration gear reducing the rotating speed of the input shaft; an indicator rotating with the first, second, and third deceleration gear; and a number plate fixed to indicate the time written on the peripherals thereof by the indicator.

Further, the output shaft is suspended by a stopping means during operation, and the stopping means includes a shaft installed rotatably above the pendulum plate, a blade formed to be projected from the shaft, and a handle fixed to an end portion of the shaft, wherein the handle is rotated in order that the blade presses an end portion of one side in the pendulum plate, and then one blocking projection formed in the pendulum plate is inserted in the ratchet wheel so that the rotation of the output shaft is stopped.

Still further, the rotation of the output shaft is stopped by a zero setting means in the position, which the indicator of the indicating means indicates '0' in number plate, and the setting means includes a disk formed integrally in opposite surface of the third deceleration gear in the indicating means, a projection formed on a circumference of the disk corresponding to '0' of the number plate, and a rod installed rotatably about the center portion, one end portion thereof being located on the upper part of the pendulum plate and the other end portion contacting with the circumferential surface of the disk elastically, wherein as the indicator reaches '0' of the number plate, one end portion of the rod is lifted by the projection, simultaneously, the other part of the rod presses one end portion of the pendulum plate, and the blocking projection maintains inserted in the ratchet wheel so that the rotation of the output shaft is stopped.

BRIEF DESCRIPTION OF THE DRAWINGS

The features and advantages of the present invention will be more described specifically in the following description of preferred embodiments of the invention with reference to the accompanying drawings wherein.

DETAILED DESCRIPTION OF THE PREFERRED EMBODIMENT

Reference will now be made in detail to the preferred embodiments of the present invention, examples of which are illustrated in the accompanying drawings. In explaining the present invention, the same names and reference numerals will be given to the same components, and explanations in the same will be omitted.

Figure 1:
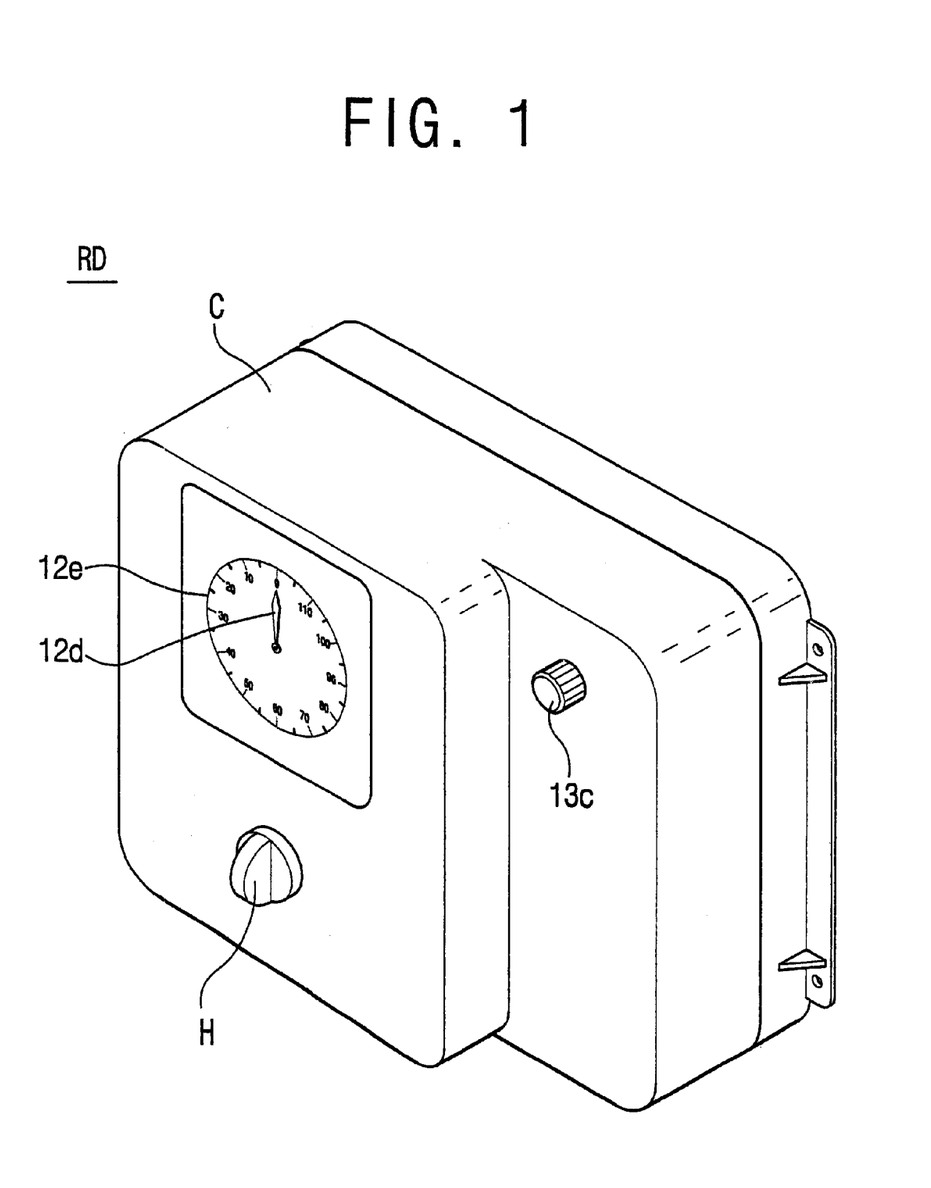
FIG. 1 is an assembled schematic view of an apparatus for generating rotative force using spring according to the present invention.
Figure 2:
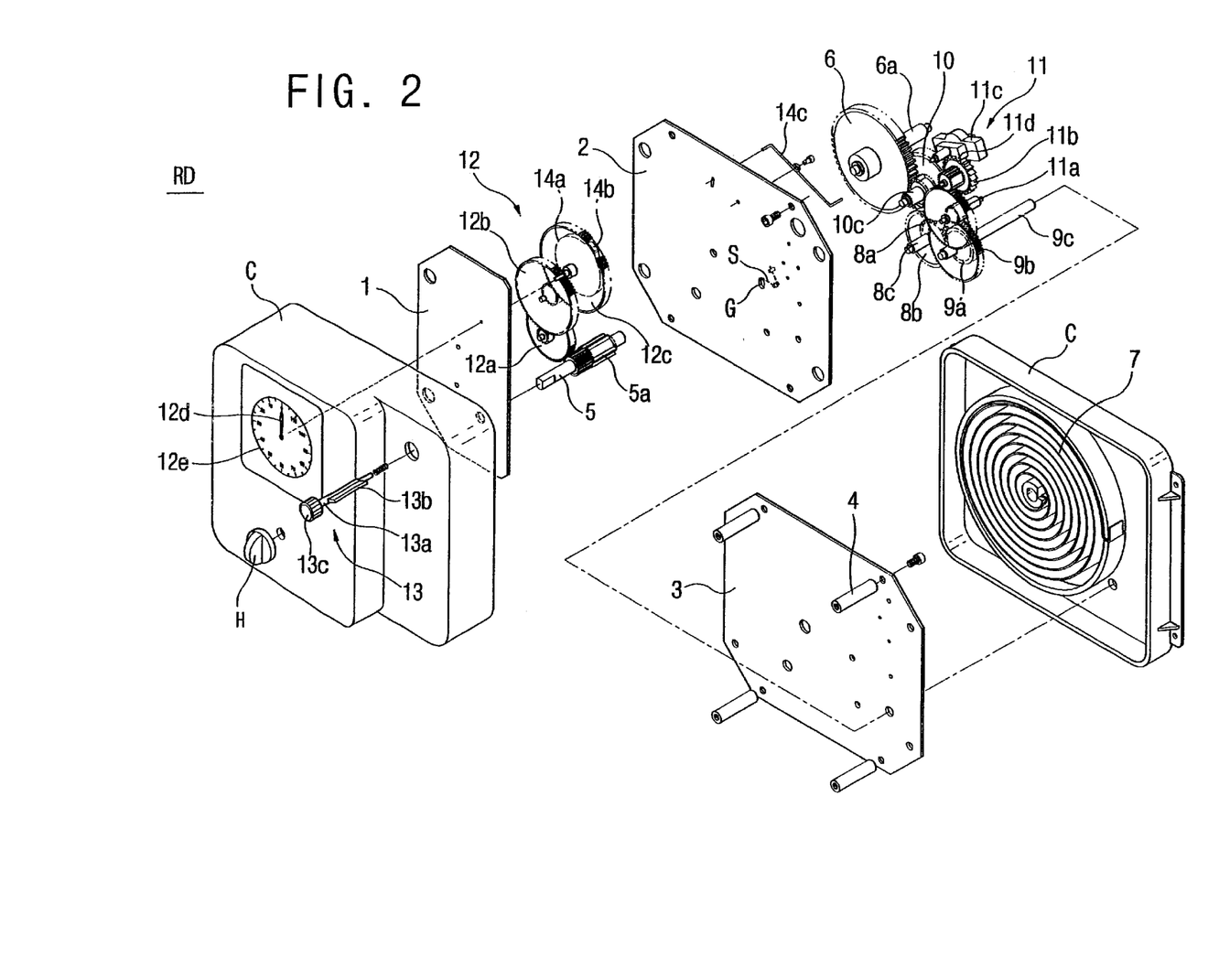
FIG. 2 is an exploded schematic view of the apparatus for generating rotative force using spring according to the present invention.
Figure 3:
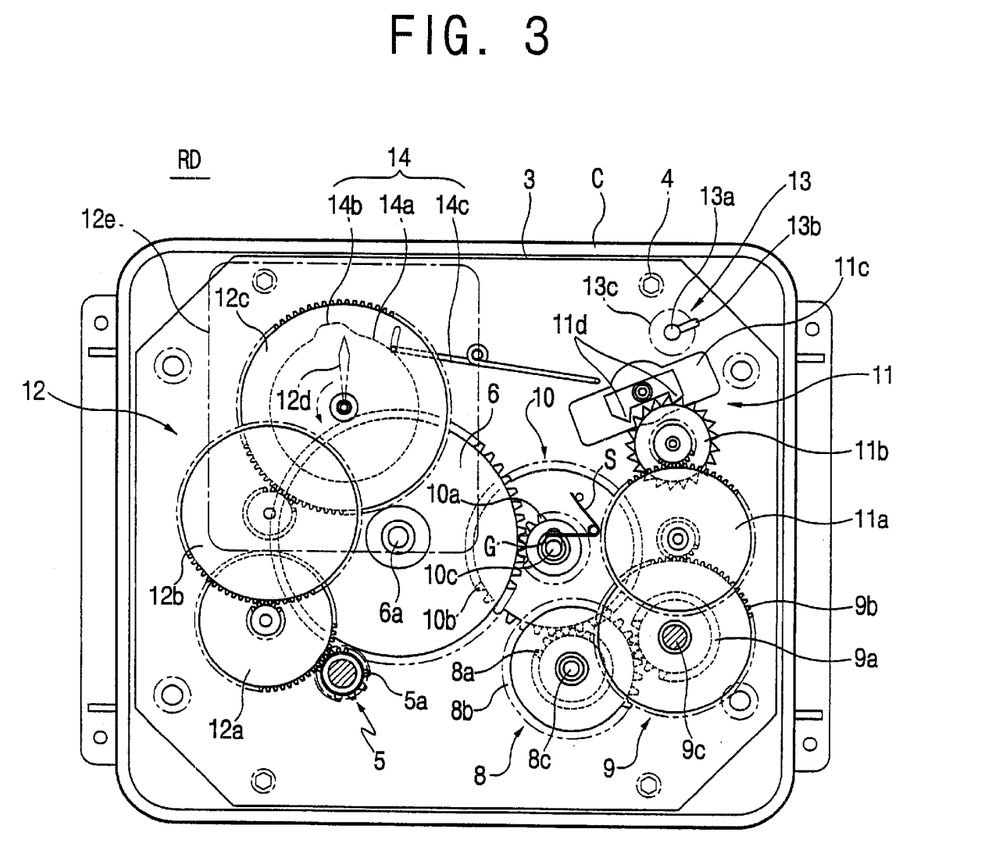
FIG. 3 is a front view of the apparatus for generating rotative force using spring according to the present invention.

FIG. 1 illustrates an assembled schematic view of an apparatus for generating rotative force using spring according to the present invention, FIG. 2 illustrates an exploded schematic view of the apparatus for generating rotative force using spring according to the present invention, and FIG. 3 illustrates a front view of the apparatus for generating rotative force using spring according to the present invention respectively.

A reference numeral 1, 2, and 3 is a first, second, and third partition fixed by fastener 104 to be parallel each other with a predetermined interval, and these first second, and third partition 1, 2, 3 are accommodated in case C.

An input shaft 5 is coupled rotatably through the first, second, and third partition 1, 2, 3, one end of this input shaft 5 is projected to an outside of the first partition 1, and a small gear 5a is coupled to input shaft 5 between the first, second, and third partition 1, 2, 3.

A reference numeral H is a handle, which is joined to the end of the input shaft 5 projected to the outside of the case C so as to allow the input shaft 5 to be rotated easily.

A main gear 6 is installed rotatably between the second and third partition 2, 3 by the main gear shaft 6a, the main gear shaft 6a is projected to an outside of the third partition 3 and the main gear 6 is engaged with the small gear 5a.

On an outer circumference of the main gear shaft 6a projected to the outside of the third partition 3, a spring 7 wound spirally is disposed. And, an inner end of the spring 7 is fixed to the outer circumference of the main gear shaft 6a, and an outer end of the spring 7 is fixed to an inside of the case C.

In the structure described above, when the input shaft 5 is rotated in the spring 7-wound direction, rotative force is transmitted to the small gear 5a, main gear 6 and spring 7 so that elastic rotative force is stored in the spring 7, and when external force is removed from the input shaft 5, the main gear 6 and input shaft 5 are rotated opposite to the previous direction by the elastic rotative force of the spring 7.

A first acceleration gear 8 including a small gear 8a and a large gear 8b, is installed rotatably to be spaced apart from the main gear 6 between the second and third partition 2, 3 by a gear shaft 8c. And, adjacent to the first acceleration gear 8, a second acceleration gear 9 including a small gear 9a and large gear 9b is installed rotatably between the second and third partition 2, 3 by an output shaft 9c. The output shaft 9c of the second acceleration gear 9 is projected to the outside of the third partition 3, and the small gear 9a of the second acceleration gear 9 is engaged with the large gear 8b of the first acceleration gear 8.

Between the main gear 6 and the first acceleration gear 8, an intermitting gear 10 including a small gear 10a and large gear 10b is installed rotatably by a gear shaft 10c. The gear shaft 10c could move up and down along a guide groove G formed between the second and third partition 2, 3, and could be supported by an elasticity of a spring S. The small gear 10a and the large gear 10b are engaged with the main gear 6 and the small gear 8a of the first acceleration gear 8 respectively. It is preferable that the spring S has elastic force enough to support the weight of the intermitting gear 10. Such a spring S is to prevent the intermitting gear 10 from being unable to be engaged with the first acceleration gear 8 by sliding in the guide groove G due to self weight, when the apparatus according to the present invention is inclined and upside down.

Figure 4:
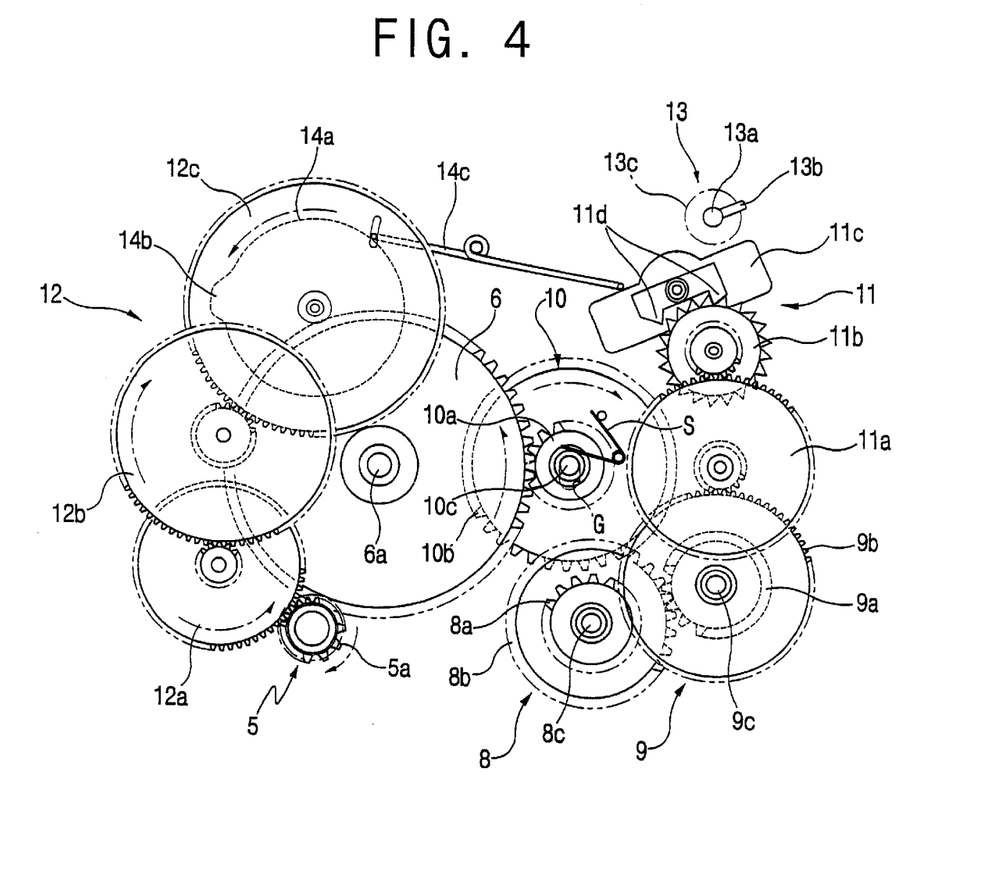
FIG. 4 is a front view for describing procedures to allow rotative force to the spring by external force in the apparatus for generating rotative force using spring according to the present invention.

In the above structure, when the input shaft 5 is rotated in order that the spring 7 10 is wound, the gear shaft 10c of the intermitting gear 10 is shifted in the guide groove G by the rotating moment of the main gear 6, as shown in FIG. 4. In this status, since the small gear 10a of the intermitting gear 10 rotates engaged with the main gear 6, but the main gear 10b slides out from the small gear 8a of the first acceleration gear 8, rotative force of the input shaft 5 is transmitted not to output shaft 9c but to the spring 7.

Figure 5:
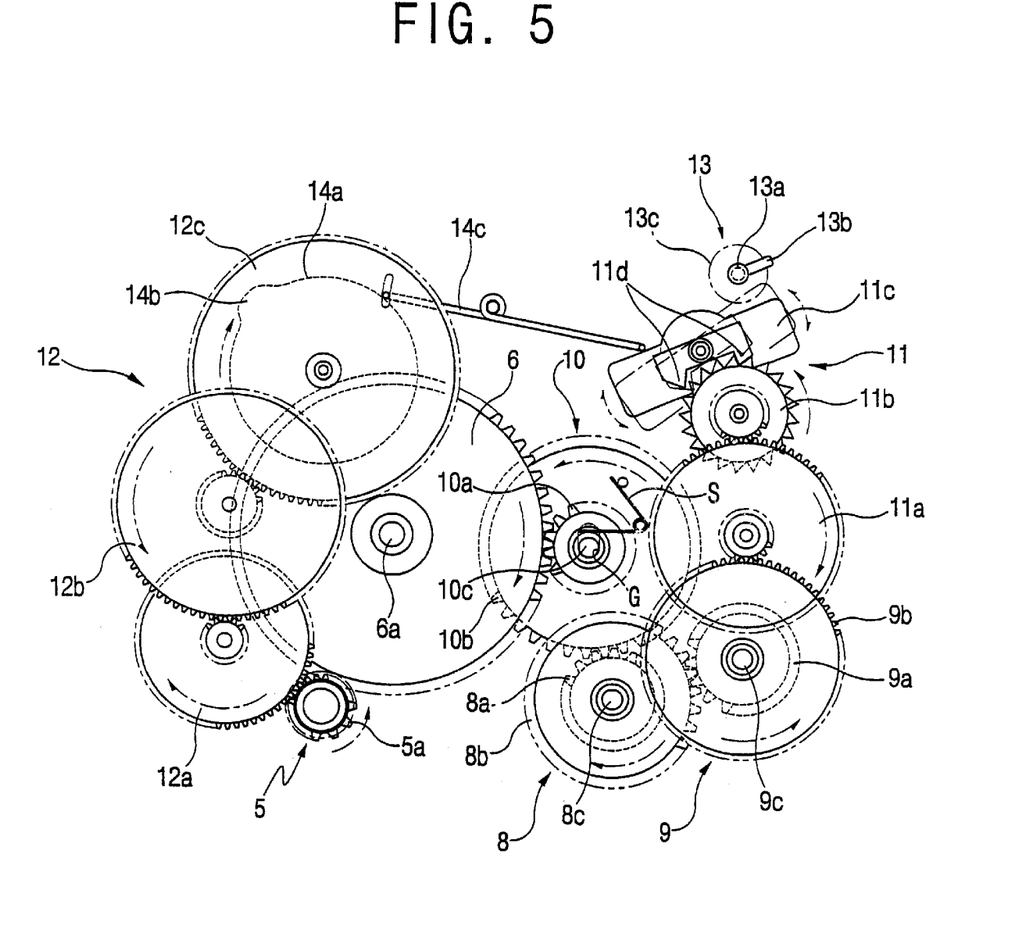
FIG. 5 is a front view for describing operating status, in which external force is removed in the apparatus for generating rotative force using spring according to the present invention.

In addition, when external force is removed from the input shaft 5, the gear shaft 10c of the intermitting gear 10 moves downwardly in the guide groove G due to the reverse rotating moment of the main gear 6, which is rotated by the elastic rotative force of the spring 7 as shown in FIG. 5. And, in this condition, the small gear 10a and large gear 10b of the intermitting gear 10 rotate engaged with the main gear 6 and the small gear 8a of the first acceleration gear 8 respectively, so that rotative force of the spring 7 is transmitted to the output shaft 9c through the main gear 6, the intermitting gear 10, and the first/second acceleration gear 8, 9.

Meanwhile, although the entire apparatus according to the present invention is inclined or upside down when elastic rotative force of the spring S is applied to the gear shaft 9c, the gear shaft 10c of the intermitting gear 10 is maintained to be moved to the first acceleration gear 8 in the guide groove G by the elastic force of the spring S, so that any problem in transmitting rotative force to the gear shaft 10c through the intermitting gear 10, does not occur.

A rotating speed of the output shaft 9c by the spring 7 is maintained at a constant speed by a control means 11.

Figure 6:
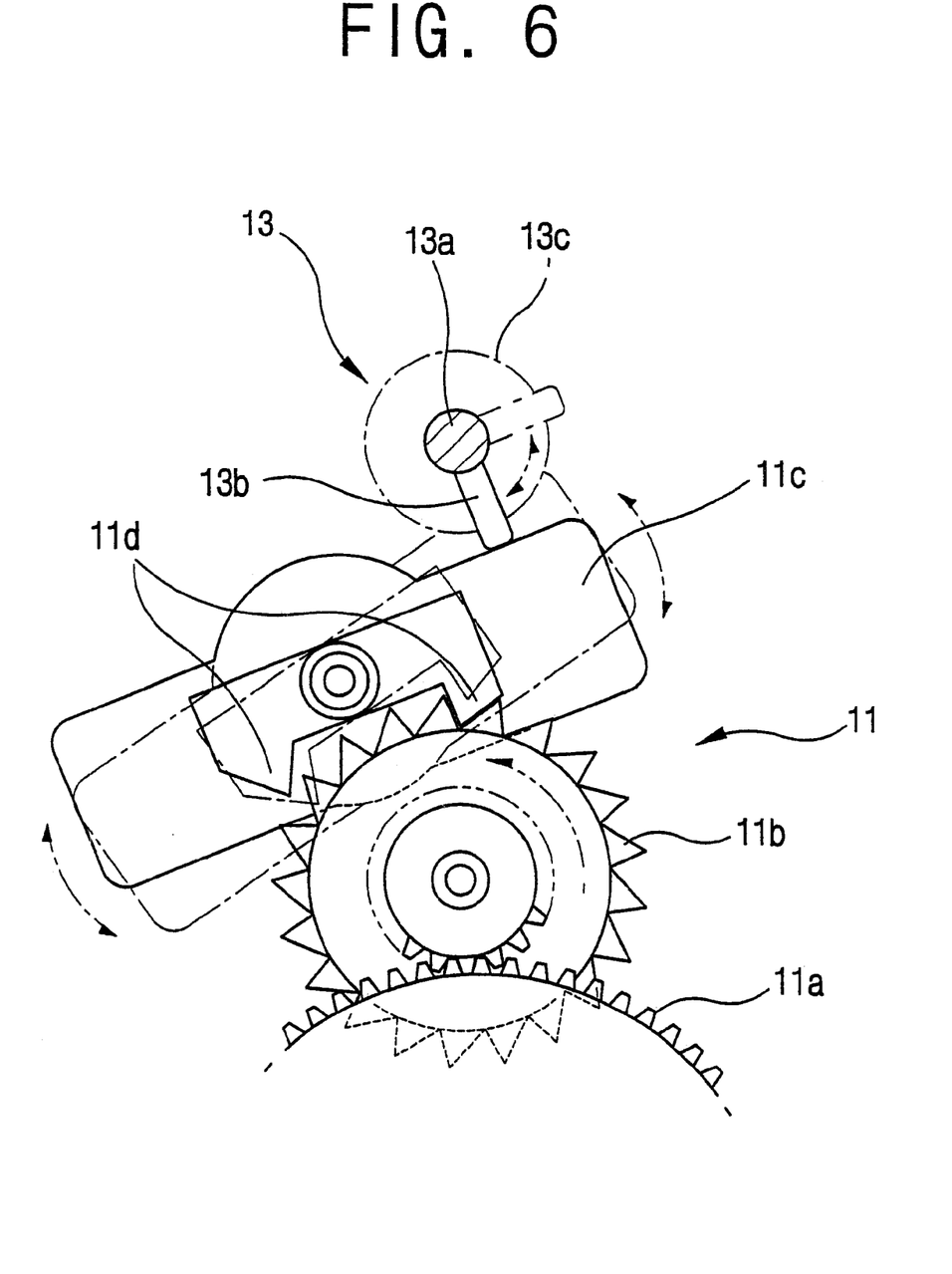
FIG. 6 is a partial front view of means for controlling rotating speed in the present invention.

The control means 11 comprises, as shown in FIG. 5 and FIG. 6, an acceleration gear 11a engaged with the second acceleration gear 9, a ratchet wheel 11b rotated by the acceleration gear 11a, a pendulum plate 11c installed rotatably to an upper part of the ratchet wheel 11b, and a pair of blocking projections 11d formed integrally in a lower part of the pendulum plate 11c toward the ratchet wheel 11b so as to be inserted in the ratchet wheel 11b.

This control means 11 keeps the rotating speed of the output shaft 9c constant by the operation in which the pair of the blocking projection 11d is inserted sequentially in the ratchet wheel 11b with sliding along the teeth surface of the ratchet wheel 11a rotating together with the output shaft 9c.

An available time for rotation of the output shaft 10a is indicated by an indicating means 12.

The indicating means 12, as shown in FIG. 2 and FIG. 3, comprises a first, second, and third deceleration gear 12a, 12b, 12c reducing the rotating speed with engaged with the small gear 5a between the first and second partition 1, 2, an indicator 12d disposed in front of the case C to be rotated with the third deceleration gear 12c, and a number plate 12e fixed to indicate the time with the indicator 12c with a time written on the peripherals thereof.

With these structure, as the input shaft 5 is rotated, the rotation of the input shaft is transmitted decreased to the indicator 12d through the first, second, and third deceleration gear 12a, 12b, 12c, and the indicator 12d represents available time by indicating a number on the number plate 12e.

The output shaft 9c could be stopped during the rotation operation by a stopping means 13.

The stopping means 13, as shown in FIG. 2 and FIG. 6, comprises a shaft 13a installed rotatably to the second and third partition 2, 3 above the pendulum plate 11c, a blade 13b formed to be projected along the extension direction, and a handle 13c fixed to an end portion of the shaft 13a projected in front of the case C.

With these structure of the stopping means 13, the handle 13c is rotated in order that the blade 13b presses an end portion of one side in the pendulum plate 11c, and then one blocking projection 11a is inserted in the ratchet wheel 11b so that the rotation of the output shaft 9c is stopped.

The rotation of the output shaft 9c is stopped by a zero setting means 14 in the position, which the indicator 12d of the indicating means 12 indicates '0' in number plate 12e.

Figure 7:
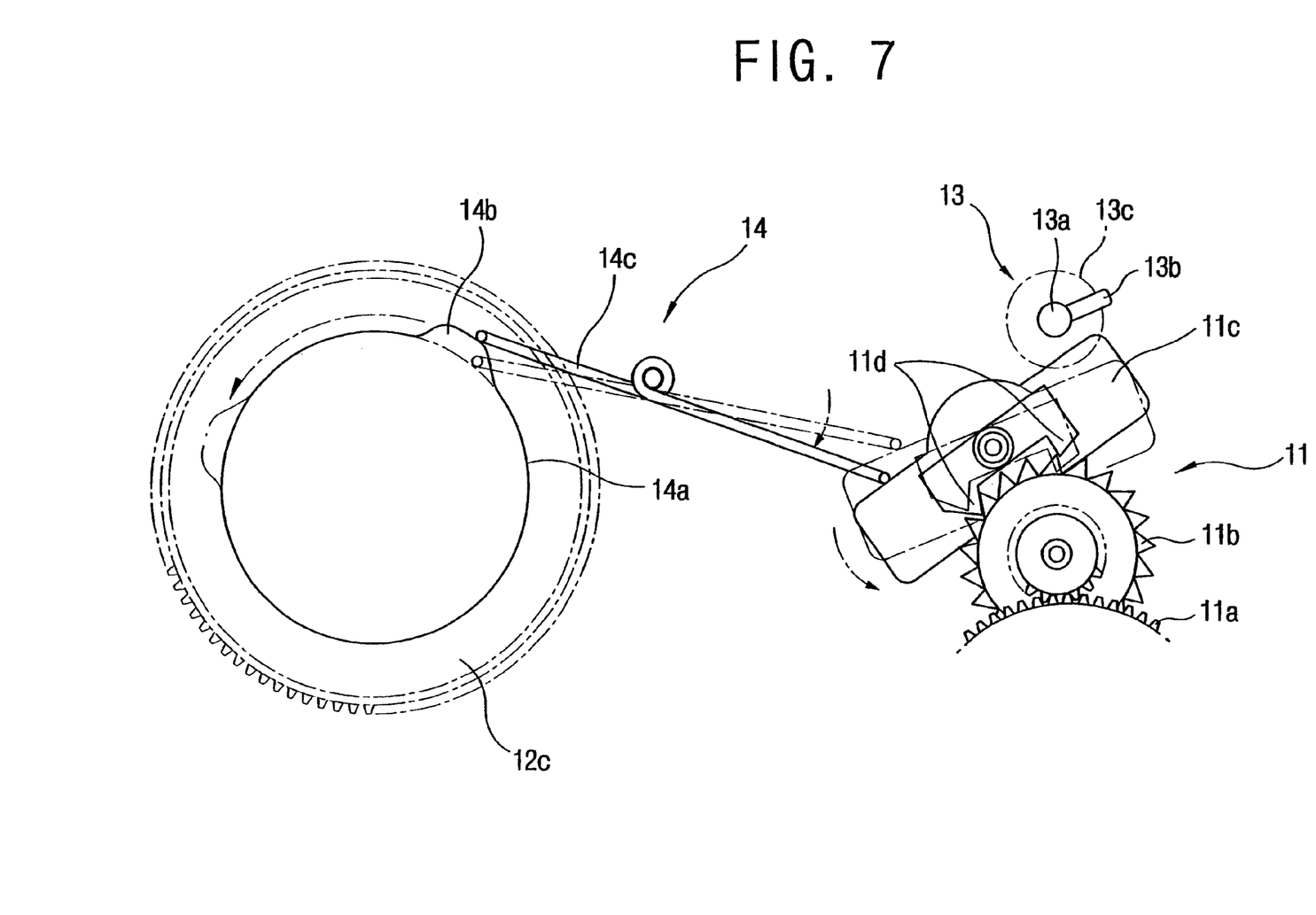
FIG. 7 is a partial front view of means for setting zero in the present invention.

The setting means 14 comprises, as shown in FIG. 7, a disk 14a formed integrally in opposite surface of the third deceleration gear 12c in the indicating means 12, a projection 14b formed on a circumference of the disk 14a corresponding to '0' of the number plate 12e, and a rod 14c installed rotatably about the center portion, one end portion thereof being located on the upper part of the pendulum plate 11c, and the other end portion contacting with the circumferential surface of the disk 14a elastically.

With these structure of the zero setting means 14, when the indicator 12d reaches '0' of the number plate 12e, that is the status that rotative force of the spring 7 is terminated, so that it could not be applied to the output shaft 9c, one end portion of the rod 14c is lifted by the projection 14b. And, simultaneously, the other part of the rod 14c presses one end portion of the pendulum plate 11c and the blocking projection 11d maintains inserted in the ratchet wheel 11b so that the rotation of the output shaft 9c is stopped.

In generating rotative force by the apparatus RD according to the present invention, the input shaft 5 is rotated in the direction, which the spring is wound.

In the rotation of the input shaft 5 as above, since the large gear 10b of the intermitting gear 10 slides out from the small gear 8a of the first acceleration gear 8, rotative force of the input shaft 5 is transmitted not to output shaft 9c but to the spring 7 through the main gear 6 and main gear shaft 6a, so that the spring 7 stores elastic rotative force wound to the input shaft 5.

During the rotation of the input shaft 5, since the elastic rotative force stored in the spring 7 is transmitted to the output shaft 9c temporarily as external force is not applied to the input shaft 5, the input shaft 5 is not rotated oppositely by the elastic force of the spring 7.

When external force is removed after storing the elastic force in the spring 7 as above, the main gear 6 and input shaft 5 rotate oppositely to the previous direction by the stored elastic force in the spring 7, and the rotative force of the main gear 6 becomes the final rotative force through the output shaft 9c, accelerated through the intermitting gear 10 and the first and second gear 8, 9.

In the above operation, the available time for rotation of the output shaft 9c is confirmed by checking the indicator 12d on the number plate 12e. And, when the elastic force of the spring 7 is terminated and the indicator 12d indicates '0' of the number plate 12e, the operation of the output shaft 9c is stopped by the zero setting means 14.

Meanwhile, when the suspension is required during the operation, the operation of the output shaft 9c is stopped by rotating the handle 13c of the stopping means 13, as mentioned above.

Figure 8:
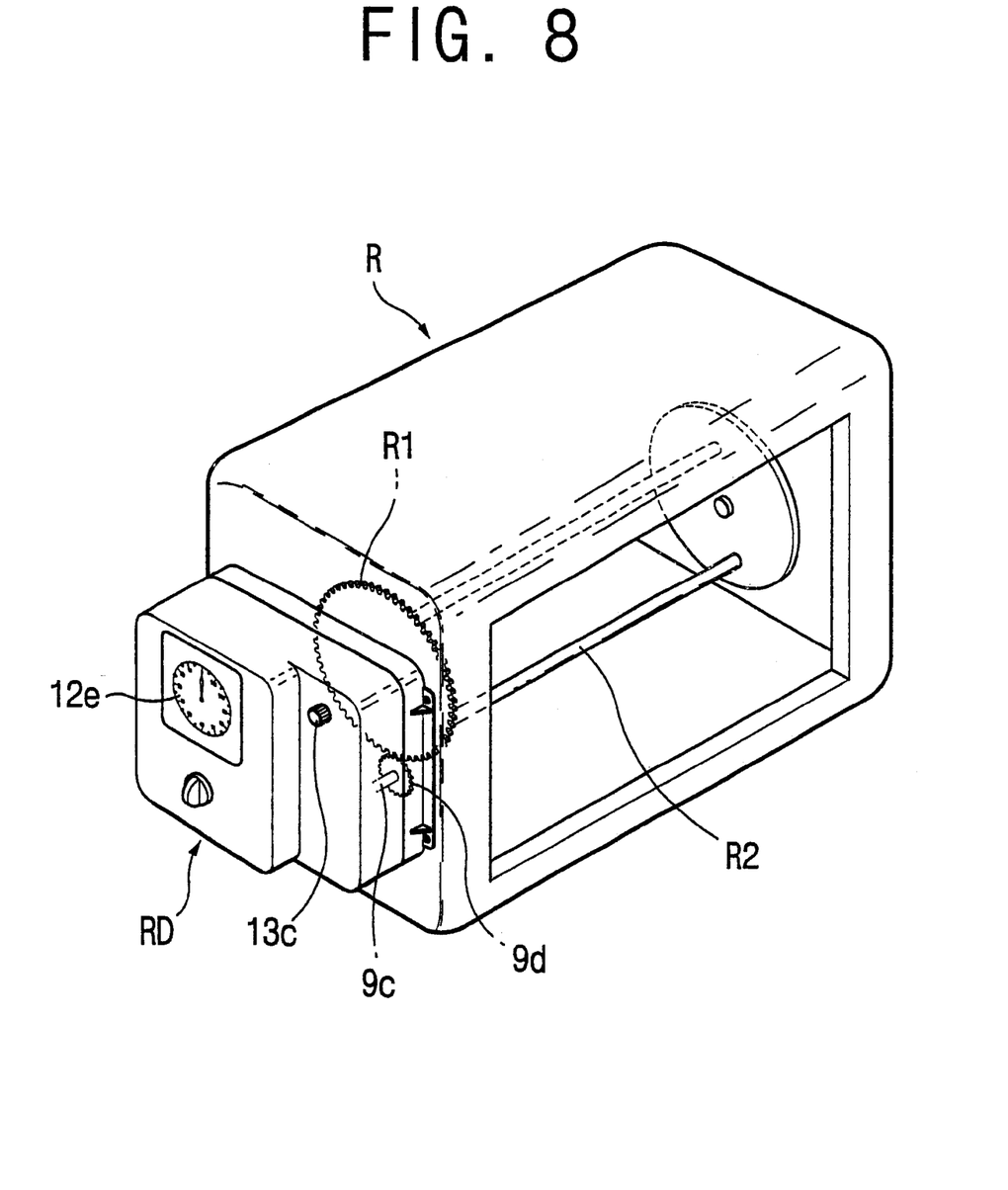
FIG. 8 is a schematic view showing an appliance of the apparatus for generating rotative force according to the present invention.

For example, the present invention as described above may be applied to a rotary roaster R used in the outdoors without electricity as shown in the FIG. 8.

That is, with installing the apparatus RD of the present invention to a side of the rotary roaster R, fixing a output gear 9d on the output shaft 9c, and engaging the output gear 9d with a rotating plate R having teeth on the outer circumference, the rotating plate R1 could be rotated for a long time.

Therefore, as food to be cooked is fixed to a rod R2, rotated by the apparatus RD and roasted with a fire under the rotary roaster R, the food is roasted entirely and uniformly in a cavity.

The apparatus for generating rotative force using spring according to the present invention permits rotative force of the input shaft to be intermitted to the acceleration gear by the intermitting gear, the available time for the rotation of the output shaft to be confirmed by the indicating means, and the operation to be stopped by the stopping means. In addition, the apparatus causes the rotation of the output shaft to be stopped exactly in '0' position of the available time by the setting means.

Therefore, since the present invention intermits rotative force only by the intermitting gear, a production cost is reduced by the simple configuration, and thus the apparatus according to the present invention could be provided with low cost. In addition, the convenience in use is increased, since user could confirm the available time of rotation, the operation could be stopped while generating the rotative force, and the apparatus could operate in an inclined or upside down position.

Although a number of embodiment have described in the above specification, it should be apparent that the present invention could be embodied in many other specific mode included within the sprit and scope of the present invention. Thus, the present embodiments should be considered as illustrative, and the present invention could be modified within the scope of claims and the equivalent thereof.

What is claimed is:

1. An apparatus for generating rotative force using spring having:
   an input shaft;
   a main gear to which rotative force is transmitted by the input shaft;
   a spring wound spirally on an outer circumference of a main gear shaft, an inner end of the spring being fixed on the outer circumference of the main gear shaft, an outer end of the spring being fixed on a predetermined position;
   accelerating gears installed to a lower part of the main gear to increase rotative force of the main gear;
   an intermitting gear for intermitting rotative force of the main gear to the accelerating gears by sliding up and down along the rotation direction of the main gear with being engaged with the main gear;
   an output shaft outputting rotative force increased by the accelerating gears; and
   controlling means controlling rotating speed of the output shaft constantly, wherein elastic rotative force is stored into the spring as the input shaft being rotated by external force and the output shaft is rotated by the elastic rotative force stored in the spring as the external force being removed from the input shaft, being characterized in that the intermitting gear is supported toward the accelerating gear by elastic force so that rotative force of the main gear is transmitted to the accelerating gears through the intermitting gear although the apparatus is inclined or upside down.

2. An apparatus according to claim 1, being characterized in that the control means includes:
   a ratchet wheel rotating together with output gear;
   a pendulum plate installed rotatably to an upper part of the ratchet wheel; and
   a pair of blocking projections formed integrally in a lower part of the pendulum plate toward the ratchet wheel to be inserted in the ratchet wheel sequentially and repeatedly.

3. An apparatus according to claim 2, being characterized in that the output shaft is suspended by a stopping means during operation, and the stopping means includes a shaft installed rotatably above the pendulum plate, a blade formed to be projected from the shaft, and a handle fixed to an end portion of the shaft, wherein the handle is rotated in order that the blade presses an end portion of one side in the pendulum plate, and then one blocking projection formed in the pendulum plate is inserted in the ratchet wheel so that the rotation of the output shaft is stopped.

4. An apparatus according to claim 1, being characterized in that the available time of rotation in the output shaft is represented by a indicating means, and the indicating means includes:
   a first, second, and third deceleration gear reducing the rotating speed of the input shaft;
   an indicator rotating with the first, second, and third deceleration gear; and
   a number plate fixed to indicate the time written on the peripherals thereof by the indicator.

5. An apparatus according to claim 4, being characterized in that the rotation of the output shaft is stopped by a zero setting means in the position, which the indicator of the indicating means indicates '0' in number plate, and the setting means includes a disk formed integrally in opposite surface of the third deceleration gear in the indicating means, a projection formed on a circumference of the disk corresponding to '0' of the number plate, and a rod installed rotatably about the center portion, one end portion thereof being located on the upper part of the pendulum plate and the other end portion contacting with the circumferential surface of the disk elastically, wherein as the indicator reaches '0' of the number plate, one end portion of the rod is lifted by the projection, simultaneously, the other part of the rod presses one end portion of the pendulum plate, and the blocking projection maintains inserted in the ratchet wheel so that the rotation of the output shaft is stopped.

* * * * *